(12) United States Patent
Dahanayaka

(10) Patent No.: US 6,728,006 B1
(45) Date of Patent: Apr. 27, 2004

(54) METHOD, SYSTEM, AND PROGRAM FOR GENERATING A BLANK SIDE OF A PAGE IN A PRINT JOB

(75) Inventor: Shahan D. Dahanayaka, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/535,451

(22) Filed: Mar. 24, 2000

(51) Int. Cl.$^7$ .......................... H04N 1/27; G06F 15/00; G03G 15/00

(52) U.S. Cl. .................. 358/401; 358/1.18; 399/364; 399/401; 399/19

(58) Field of Search .............................. 358/1.15, 1.18; 399/364, 401, 19

(56) References Cited

U.S. PATENT DOCUMENTS

| | | |
|---|---|---|
| 4,607,948 A | 8/1986 | Naito |
| 4,639,126 A | 1/1987 | Bushaw et al. |
| 4,640,607 A | 2/1987 | Bray |
| 4,688,928 A | 8/1987 | Iwai |
| 4,924,275 A | 5/1990 | Nelson |
| 4,935,786 A | 6/1990 | Veeder |
| 5,072,261 A | 12/1991 | Housel |
| 5,095,342 A | 3/1992 | Farrell et al. |
| 5,260,758 A | 11/1993 | Stemmle |

OTHER PUBLICATIONS

IBM, "Duplex Printing with One Hammer Unit", IBM Technical Disclosure Bulletin vol. 32, No. 10A, Mar. 1990, pp. 280–281.

IBM, "Stack Received Pages Capability for Advanced Function Printers", IBM Technical Disclosure Bulletin, vol. 35, No. 1B, Jun. 1992, pp. 8–10.

IBM, "Technique for Inserting Tab Pages into Print-on-Demand System Advanced Function Printing Printer", IBM Technical Disclosure Bulletin, vol. 38, No. 10, Oct. 1995, pp. 201–202.

*Primary Examiner*—Kimberly Williams
*Assistant Examiner*—Saeid Ebrahimi
(74) *Attorney, Agent, or Firm*—David W. Victor; Konrad Raynes & Victor LLP

(57) ABSTRACT

Disclosed is a method, system, and program for generating a blank side of a page in a print job. Bitmap data is received for at least one side of at least one page of a print job. The bitmap data for the at least one side is sent to a printer engine to control the printer to print the print job over a data path. For a blank side in one page in the print job, a command is issued to resend bitmap data for one side previously sent to the printer engine. A further command is issued to disable the data path to cause the transmission of white data to the printer engine. This disabling of the data path prevents the resent bitmap data from reaching the printer engine, which, in turn, causes the printer to produce the blank side in response to receiving the white data.

24 Claims, 2 Drawing Sheets

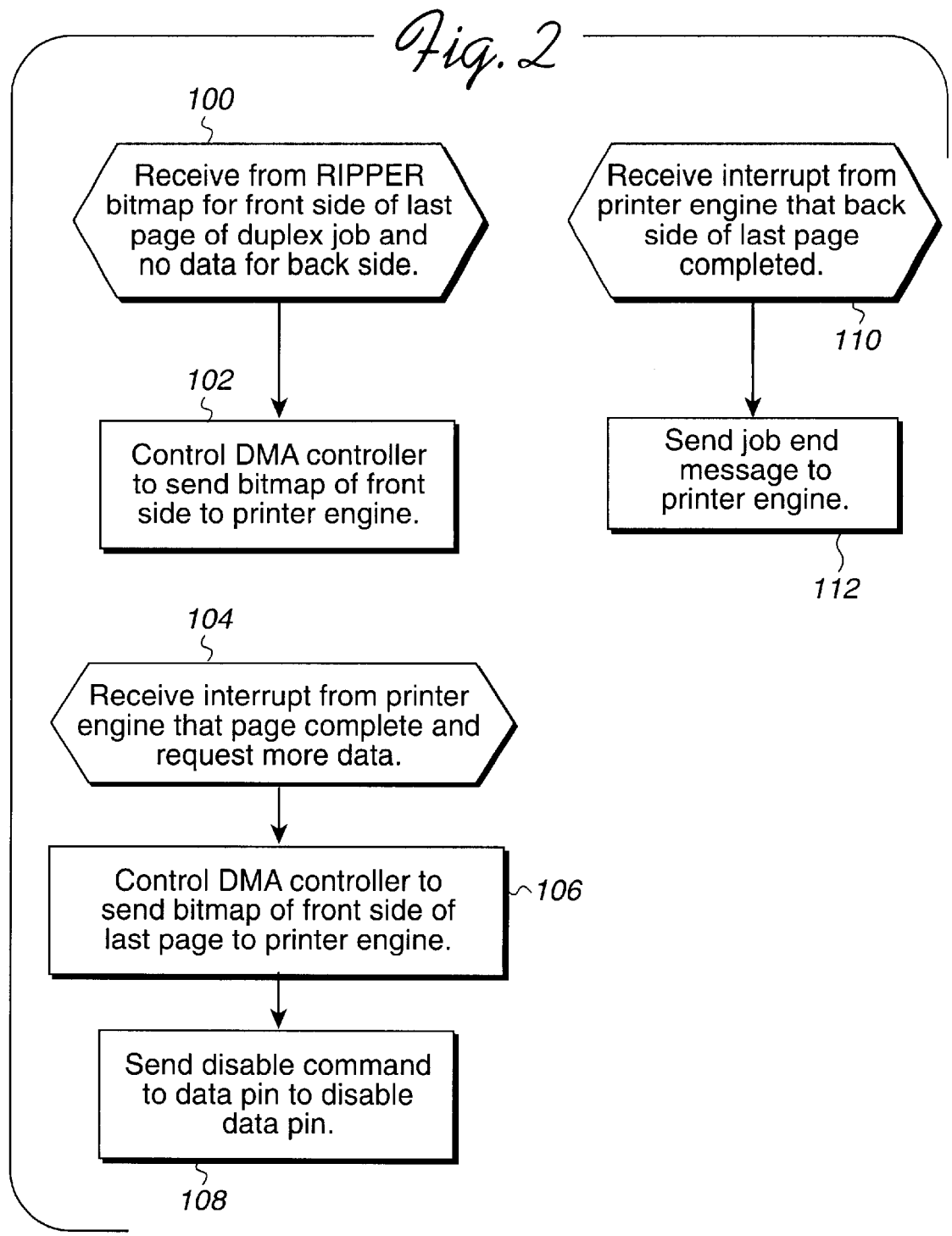

METHOD, SYSTEM, AND PROGRAM FOR GENERATING A BLANK SIDE OF A PAGE IN A PRINT JOB

BACKGROUND OF THE INVENTION

1. Field of the Invention

The present invention relates to a method, system, and program for generating a blank page in a print job and, in particular generating a blank page for a last page of a duplex print job.

2. Description of the Related Art

In printing systems, a rasterizer (RIPPER) is a component that converts print data, such as vector graphics or page description language commands, into a bitmap that instructs the printer where to deposit ink. For instance, All PostScript printers contain a RIPPER that converts the PostScript commands into bit-mapped pages that the printer can output. The printer deposits ink at the pixel locations on a page having a corresponding "on" bitmap value, and remains inactive at pixel locations having a corresponding "off" bitmap value.

A duplex print job is a print job that prints on both sides of the paper. Thus, with duplex print jobs, the RIPPER will generate separate bitmaps for the front and back side of each page. Oftentimes in a duplex print job, the back-side of the last page of the print job may be blank. The print system must include a methodology to handle a blank side of the last page. In certain prior art systems, to handle a blank side on the last page of a duplex job, the RIPPER generate a bitmap including all "off" values or zeros to cause the printer to print nothing on the blank side of the page. To implement this blank page approach, the RIPPER could either generate a blank bitmap or maintain blank bitmaps in memory for each possible paper size. In either case, this technique is disadvantageous because RIPPER processing cycles and memory are needed to generate the blank bitmap or maintain blank bitmaps for different paper sizes in memory for the blank back side of the last page.

Other prior art systems handle a blank side of the last page of a duplex print job by providing no data for the blank back side. This causes the printer engine to generate error interrupts on each scan line being processed as the scan line is passing through the printer. The printer driver, also referred to as the printer mechanism or printer controller, must then handle these error interrupts from the printer engine and determine to ignore the errors received when the blank side is being processed. This technique is disadvantageous because the generation of error interrupts by the printer engine for each scan line slows down the printer engine process to generate the error interrupts and slows down the printer mechanism process by requiring the printer mechanism to handle and choose to ignore each error interrupt.

Thus, there is a need in the art for an improved technique for handling a blank back side of the last page of a print job that avoids some of the above described disadvantages with current art tec

SUMMARY OF THE PREFERRED EMBODIMENTS

To overcome the limitations in the prior art described above, preferred embodiments disclose a method, system, and program for generating a blank side of a page in a print job. Bitmap data is received for at least one side of at least one page of a print job. The bitmap data for the at least one side is sent to a printer engine to control the printer to print the print job over a data path. For a blank side in one page in the print job, a command is issued to resend bitmap data for one side previously sent to the printer engine. A further command is issued to disable the data path to cause the transmission of white data to the printer engine. This disabling of the data path prevents the resent bitmap data from reaching the printer engine, which, in turn, causes the printer to produce the blank side in response to receiving the white data.

In further embodiments, the data path includes a pin connector that is used to communicate data to the printer engine. In such case, the disable command disables the pin through which bitmap data is sent to the printer engine.

In still further embodiments, the blank side may be the last page of the print job or the resent bitmap data may comprise the last sent bitmap data.

Still further, the print job may comprise a duplex print job. In such case, the blank side may comprise a back side of the last page of the duplex print job and the bitmap data resent may comprise the bitmap data previously sent for a front side of the last page of the print job.

Preferred embodiments provide an improved technique for generating a blank side of a page, such as a blank back side for the last page of a duplex print job. Preferred embodiments do not require generating or maintaining a bitmap for a blank page, i.e., a bitmap of all zeros, as do certain prior art techniques, thereby conserving processor cycles and memory over such prior art techniques. The preferred embodiments further avoid generating numerous error interrupts which result in prior art techniques that send no data to the printer engine for the blank side. Instead, the preferred embodiments send data thereby avoiding the need to generate and handle interrupts.

BRIEF DESCRIPTION OF THE DRAWINGS

Referring now to the drawings in which like reference numbers represent corresponding parts throughout:

FIG. 2 illustrates printer mechanism logic to handle a blank side of the last page of a duplex print job in accordance with preferred embodiments of the present invention.

DETAILED DESCRIPTION OF THE PREFERRED EMBODIMENTS

Figure 1:
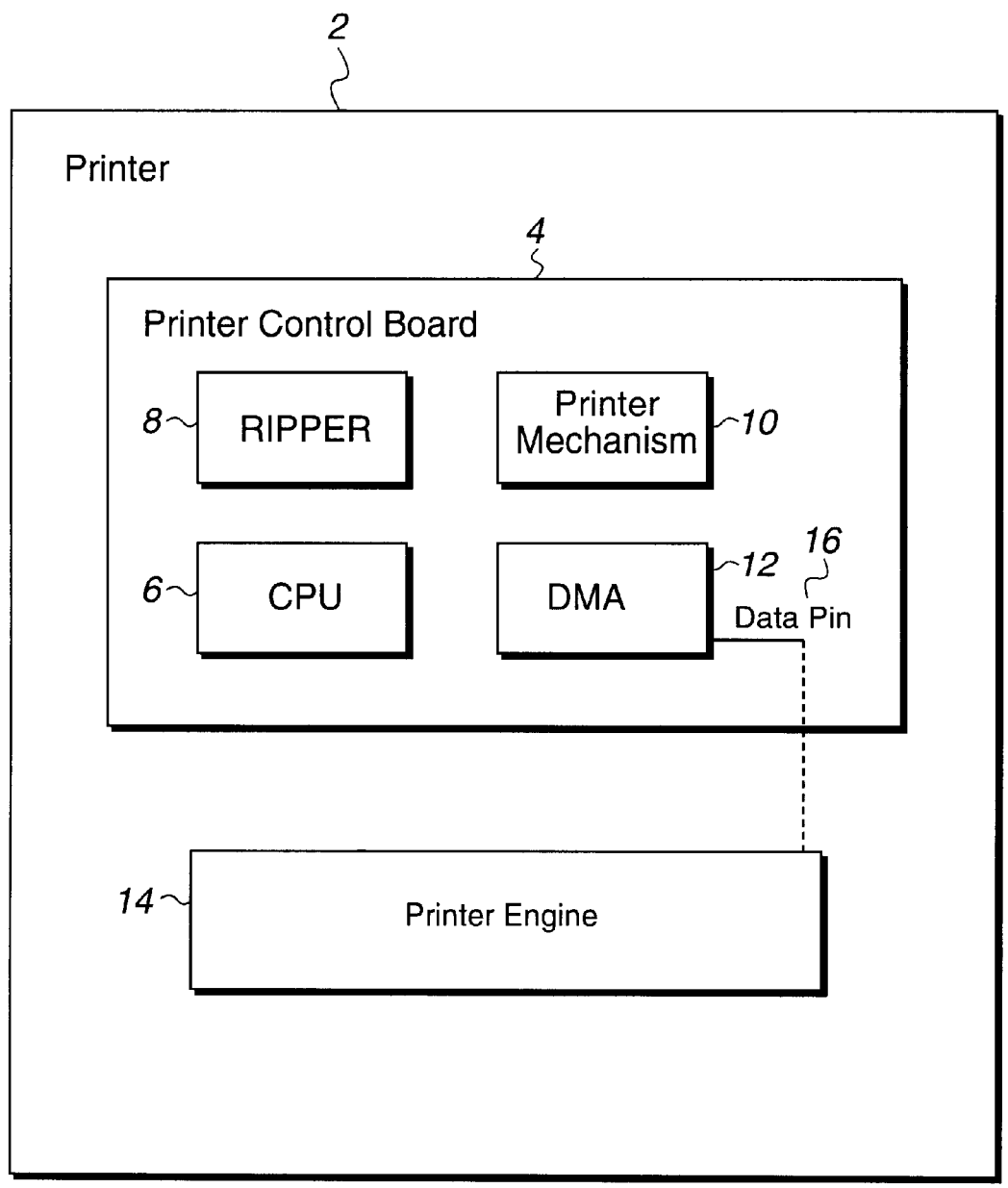
FIG. 1 is a block diagram illustrating a printer computing environment in which preferred embodiments of the present invention are implemented.

In the following description, reference is made to the accompanying drawings which form a part hereof and which illustrate several embodiments of the present invention. It is understood that other embodiments may be utilized and structural and operational changes may be made without departing from the scope of the present invention.

FIG. 1 illustrates a printer computing environment in which preferred embodiments of the present invention are implemented. A printer 2 includes a printer control board 4 including a central processing unit (CPU) 6, RIPPER 8, printer mechanism 10, a direct memory access (DMA) controller 12, and printer engine 14. In preferred embodiments, the RIPPER 8 and printer mechanism 10 are implemented as code executed by the CPU 6. The CPU 6 may comprise one or more microprocessor complexes or any processor device known in the art capable of executing code. The DMA 12 is implemented as hardware logic, such as an application specific integrated circuit (ASIC), or alternatively any other type of hardware logic known in the art on the control board 4.

The printer mechanism 10 code, executed by the CPU 6, controls the DMA 12 to transfer data through DMA channels directly to and from memory and the printer engine 14. Specifically, the DMA 12 is used to transfer bitmaps, rendered by CPU 6 executing the RIPPER 8 code, to the printer engine 14 to control the deposition of ink on the paper. The printer engine 14 includes logic to convert the bitmap data into signals to control the printer mechanisms, such as the ink dispensing and paper transfer mechanisms, e.g., print heads, rollers, etc. The RIPPER 8 code generates the bitmaps for a page. The CPU 6 executes the printer mechanism 10 to control the DMA controller 12 to manage the transfer of the bitmap data in memory (not shown) to the printer engine 14 through DMA data transfer channels. The printer engine 14, based on the pixel information in the bitmap, will generate commands to control the print heads and paper mechanisms to print.

The CPU 6, DMA 12, and printer engine 14 are implemented in one or more integrated circuit components that include pins to provide communication therebetween. Specific pins are used for specific operations. For instance, certain pins are designated to transfer and receive data, others commands. The DMA controller 12 includes data pin 16 through which the DMA controller 12 transfers bitmap data to one pin on the printer engine 14.

FIG. 2 illustrates logic implemented in the printer mechanism 10 code, executed by the CPU 6, to handle the situation where the back side of the last page of a duplex print job is blank. At block 100, the printer mechanism 10 receives a bitmap, generated by the CPU 6 when executing the RIPPER 8 code, for the front side of the last page of a duplex job and no data for the back side of the last page. The printer mechanism 10 instructs (at block 102) the DMA controller 12 to transfer the bitmap for the front side of the last page to the printer engine 14.

Upon receiving (at block 104) an interrupt from the printer engine 14 that the page was printed and requesting more data, the printer mechanism 10 instructs (at block 106) the DMA controller 12 to transfer the bitmap for the front side of the last page, again, to the printer engine 14. At the same time, the printer mechanism 10 sends (at block 108) a command to disable the data pin 16, thus causing the printer mechanism 10 to transmit white data, i.e., all zeros, to the printer engine 14. In response, the printer engine 14 would receive the white data or zeros and believe that this data is the bitmap data. This data from the disabled data pin 16 would have the same affect as a bitmap of all zeros, causing the printer engine 14 to inactivate the printer heads for all pixels on the back side of the last page. After the printer engine 14 "prints" the blank data, i.e., by causing the printer heads to do nothing for the back side of the last page, the printer engine 14 sends a page complete message to the printer mechanism 10, which causes the printer mechanism (at block 110) to return (at block 112) an end of job message to the printer engine 14.

The above technique for handling a blank back side of the last page of a duplex print job avoids the disadvantages with the current prior art techniques. With the above technique, the CPU 6 executing the RIPPER 8 and printer mechanism 10 code does not have to devote processing and memory resources to maintain or generate bitmaps for a blank page to send to the printer engine 14 to produce a blank back side. Further, because the DMA controller 12 is sending data for the blank page and the printer engine 14 is receiving data as expected, no error interrupts will be generated by the DMA controller 12 or the printer engine 14 to the CPU 6 to handle when executing the printer mechanism 12 code. The prior art techniques of sending the printer engine no data for the last page causes the DMA controller and printer engine to generate error interrupts, which burdens the generator of those interrupts, i.e., the DMA controller and printer engine, as well as the CPU that must handle those interrupts and make the decision to ignore the error interrupts. With the technique of the preferred embodiments, no error interrupts are generated while the printer engine 14 and DMA controller 12 process the back side of the last page as bitmap data is transmitted and apparently received by the printer engine 14.

In this way, the above technique for handling a blank back side of the last page of a duplex job is an improvement over the prior art techniques.

CONCLUSIONS AND ALTERNATIVE EMBODIMENTS

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described with respect to handling a blank page for the back side of the last page of a duplex print job. However, the preferred embodiment technique of resending data and disabling the connection path can be used for blank sides in non-duplex print jobs and for situations where the blank side is not the back side of the last page. In such case, if the blank side was in a middle page of the job, the printer mechanism would have to turn off the disable command after completing the blank page to allow bitmap data to be sent for subsequent nonblank sides.

In preferred embodiments, the printer mechanism 10 instructs the DMA controller 12 to resend the bitmap data for the last printed side to the printer engine 14. However, in alternative embodiments, bitmap data for another previously sent side of a page may be resent for the blank side, as long as such bitmap data is still buffered in memory and accessible to the DMA channels.

In preferred embodiments, the RIPPER 8, printer mechanism 10, and printer engine 14 were implemented on the same circuit board 4. In alternative embodiments, the RIPPER 8 may be implemented in one computer system and the printer mechanism 10 and printer engine 14 in another, such that the computer including the RIPPER 8 logic would have to communicate the bitmap renderings of the page data to the printer mechanism 10 over a network or other connection, such as a cable.

The logic of the RIPPER 8, printer mechanism 10, and the printer engine 14 may be implemented as programmable logic executed by a CPU or implemented as hardwired logic, e.g., ASICs, FPGAs, etc. Still further, the RIPPER 8, printer mechanism 10, and printer engine 8 may be implemented on separate circuit cards that interconnect, such as an expansion card in an expansion slot of the printer control board 4.

In preferred embodiments, the CPU 6 and printer engine 14 communicate through pin connectors on the printer control board 4. If, however, the CPU 6 and printer engine 14 communicated along some different data path other than a pin connector, then in alternative embodiments, the CPU 6, executing the printer mechanism 10 code, would still send a command to disable the data path between the DMA controller 12 and printer engine 14 so that white data is transmitted over the data path even though the DMA controller 12 is sending data to the data path for transmission to the printer engine 14.

In summary, preferred embodiments disclose a disclose a method, system, and program for generating a blank side of a page in a print job. Bitmap data is received for at least one side of at least one page of a print job. The bitmap data for the at least one side is sent to a printer engine to control the printer to print the print job over a data path. For a blank side in one page in the print job, a command is issued to resend bitmap data for one side previously sent to the printer engine. A further command is issued to disable the data path to cause the transmission of white data to the printer engine. This disabling of the data path prevents the resent bitmap data from reaching the printer engine, which, in turn, causes the printer to produce the blank side in response to receiving the white data.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for generating a blank side of a page in a print job, comprising:

receiving bitmap data for at least one page of a print job;

sending the bitmap data for the at least one side of a page to a printer engine to control the printer to print the print job, wherein the bitmap data is communicated to the printer engine over a data path;

for a blank side of one page in the print job, issuing a command to resend bitmap data for one side previously sent to the printer engine; and issuing a command to disable the data path to cause the transmission of white data to the printer engine, whereby the disabling of the data path prevents the resent bitmap data from reaching the printer engine, and whereby the printer engine causes the printer to produce the blank side in response to receiving the white data.

2. The method of claim 1, wherein the data path includes a pin connector that is used to communicate data to the printer engine, wherein the disable command disables the pin through which bitmap data is sent to the printer engine.

3. The method of claim 1, wherein the blank side is on the last page of the print job.

4. The method of claim 3, wherein the bitmap data resent comprises the last sent bitmap data.

5. The method of claim 1, wherein the print job comprises a duplex print job.

6. The method of claim 5, wherein the blank side is on the last page of the duplex print job.

7. The method of claim 6, wherein the bitmap data resent comprises the bitmap data previously sent for a front side of the last page of the print job.

8. The method of claim 1, wherein the bitmap data is sent to the printer engine by controlling a Direct Memory Access (DMA) controller to transfer the bitmap data from memory to the printer engine over the data path.

9. A system for generating a blank side of a page in a print job, comprising:

a processor;

a printer engine for generating commands to control a print job in response to bitmap data for the print job;

a data path between the processor and printer engine through which bitmap data is transferred; and code, executed by the processor, for performing:
   (i) receiving bitmap data for at least one page of a print job;
   (ii) sending the bitmap data for the at least one side of a page to the printer engine over the data path to control the printer to print the print job,
   (iii) issuing a command to resend bitmap data for one side previously sent to the printer engine for a blank side of one page in the print job; and
   (iv) means for issuing a command to disable the data path to cause the transmission of white data to the printer engine, whereby the disabling of the data path prevents the resent bitmap data from reaching the printer engine, and whereby the printer engine causes the printer to produce the blank side in response to receiving the white data.

10. The system of claim 9, wherein the data path includes a pin connector that is used to communicate data to the printer engine, wherein the disable command disables the pin through which bitmap data is sent to the printer engine.

11. The system of claim 9, wherein the blank side is on the last page of the print job.

12. The system of claim 11, wherein the bitmap data resent comprises the last sent bitmap data.

13. The system of claim 9, wherein the print job comprises a duplex print job.

14. The system of claim 13, wherein the blank side is on the last page of the duplex print job.

15. The system of claim 14, wherein the bitmap data resent comprises the bitmap data previously sent for a front side of the last page of the print job.

16. The system of claim 9, further comprising a Direct Memory Access (DMA) controller, wherein the code further causes the processor to instruct the DMA controller to transfer the bitmap data to the printer engine over the data path.

17. An article of manufacture for use in generating a blank side of a page in a print job, wherein the article of manufacture comprises at least one computer program capable of causing a processor to perform receiving bitmap data for at least one page of a print job;

sending the bitmap data for the at least one side of a page to a printer engine to control the printer to print the print job, wherein the bitmap data is communicated to the printer engine over a data path;

for a blank side of one page in the print job, issuing a command to resend bitmap data for one side previously sent to the printer engine; and issuing a command to disable the data path to cause the transmission of white data to the printer engine, whereby the disabling of the data path prevents the resent bitmap data from reaching the printer engine, and whereby the printer engine causes the printer to produce the blank side in response to receiving the white data.

18. The article of manufacture of claim 17, wherein the data path includes a pin connector that is used to communicate data to the printer engine, wherein the disable command disables the pin through which bitmap data is sent to the printer engine.

19. The article of manufacture of claim 17, wherein the blank side is on the last page of the print job.

20. The article of manufacture of claim 19, wherein the bitmap data resent comprises the last sent bitmap data.

21. The article of manufacture of claim 17, wherein the print job comprises a duplex print job.

22. The article of manufacture of claim 21, wherein the blank side is on the last page of the duplex print job.

23. The article of manufacture of claim 22, wherein the bitmap data resent comprises the bitmap data previously sent for a front side of the last page of the print job.

24. The article of manufacture of claim 17, wherein the bitmap data is sent to the printer engine by controlling a Direct Memory Access (DMA) controller to transfer the bitmap data from memory to the printer engine over the data path.

* * * * *

UNITED STATES PATENT AND TRADEMARK OFFICE
CERTIFICATE OF CORRECTION

PATENT NO. : 6,728,006 B1
DATED : April 27, 2004
INVENTOR(S) : Shahan D. Dahanayaka It is certified that error appears in the above-identified patent and that said Letters Patent is hereby corrected as shown below:

<u>Column 5,</u>
Line 50, delete "of a page" and insert -- of one page --.

<u>Column 6,</u>
Lines 1 and 7, delete "on the" and insert -- on a --.
Lines 26 and 64, delete "for the at" and insert -- for at --.
Line 27, delete "a page" and insert -- one page --.
Line 43, delete "is on the" and insert -- is on a --.
Line 50, delete "the last" and insert -- a last --.
Line 62, after "perform", insert -- : --.
Line 64, delete "of a page" and insert -- of one page --.

<u>Column 7,</u>
Line 17, delete "on the last" and insert -- on a last --.

<u>Column 8,</u>
Line 6, delete "on the last" and insert -- on a last --.

Signed and Sealed this

Eleventh Day of April, 2006

JON W. DUDAS
*Director of the United States Patent and Trademark Office*